US010783484B1

(12) United States Patent
Mishra

(10) Patent No.: US 10,783,484 B1
(45) Date of Patent: Sep. 22, 2020

(54) AUGMENTED REALITY GAMING FOR TRACKING DELIVERIES

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 685 days.

(21) Appl. No.: 15/277,619

(22) Filed: Sep. 27, 2016

(51) Int. Cl.
G06Q 30/00 (2012.01)
G06Q 10/08 (2012.01)
G06Q 30/06 (2012.01)
G06Q 50/00 (2012.01)
G06K 7/14 (2006.01)

(52) U.S. Cl.
CPC ..... *G06Q 10/08355* (2013.01); *G06K 7/1413* (2013.01); *G06K 7/1417* (2013.01); *G06Q 30/0635* (2013.01); *G06Q 50/01* (2013.01)

(58) Field of Classification Search
CPC .............................................. G06Q 1/008355
See application file for complete search history.

(56) References Cited

U.S. PATENT DOCUMENTS

| | | | |
|---|---|---|---|
| 7,103,563 B1 | 9/2006 | Voisin et al. | |
| 8,510,247 B1 | 8/2013 | Kane et al. | |
| 8,538,829 B1 | 9/2013 | Hu et al. | |
| 8,666,376 B2 | 3/2014 | Ramer et al. | |
| 8,860,587 B2 | 10/2014 | Nordstrom | |
| 9,818,145 B1 | 11/2017 | Finkelstein et al. | |
| 9,830,632 B2 | 11/2017 | Lenahan et al. | |
| 2006/0247039 A1 | 11/2006 | Lerner et al. | |
| 2008/0102956 A1 | 5/2008 | Burman et al. | |
| 2008/0102957 A1 | 5/2008 | Burman et al. | |
| 2010/0138680 A1 | 6/2010 | Brisebois et al. | |
| 2010/0169153 A1 | 7/2010 | Hwacinski et al. | |

(Continued)

OTHER PUBLICATIONS

Chang, J., Lai, C., Huang, Y., & Chao, H. (2010). 3PRS: A personalized popular program recommendation system for digital TV for P2P social networks. Multimedia Tools and Applications, 47(1), 31-48. doi:http://dx.doi.org/10.1007/s11042-009-0405-6.*

(Continued)

*Primary Examiner* — Kathleen Palavecino
(74) *Attorney, Agent, or Firm* — Kilpatrick Townsend & Stockton LLP

(57) ABSTRACT

Techniques for tracking deliveries of items and verifying route adherence by a delivery person may be described herein. For example, first information may be maintained that identifies an association of a virtual asset with a machine-readable identifier. Further, second information may be generated and maintained that identifies an association of the machine-readable identifier with an item. Upon receiving an order for an item, delivery instructions may be generated and provided to an entity for delivering the item to a location. The delivery to the location may be verified based at least in part on geo-location information provided by a user device interacting with the machine-readable identifier of the item. In embodiments, the virtual asset associated with the machine-readable identifier may be associated with a user profile corresponding to the delivery location instead of with the machine-readable identifier.

15 Claims, 12 Drawing Sheets

(56) References Cited

U.S. PATENT DOCUMENTS

| | | | |
|---|---|---|---|
| 2014/0108136 A1* | 4/2014 | Zhao | G06Q 30/02 |
| | | | 705/14.49 |
| 2015/0094080 A1 | 4/2015 | Bleecher Snyder et al. | |
| 2015/0134547 A1 | 5/2015 | Oikonomidis | |
| 2015/0142611 A1* | 5/2015 | Kaplan | G06Q 30/0635 |
| | | | 705/26.81 |

OTHER PUBLICATIONS

U.S. Appl. No. 15/277,398, filed Sep. 27, 2016, Titled: Augmented Reality Gaming for Physical Goods.
U.S. Appl. No. 15/277,468, filed Sep. 27, 2016, Titled: Customer Segmentation Using Augmented Reality Gaming.

* cited by examiner

US 10,783,484 B1

AUGMENTED REALITY GAMING FOR TRACKING DELIVERIES

BACKGROUND

Network-enabled devices allow people to utilize online services to shop, stream music, watch movies, or play video games without leaving the comfort of their homes or wherever they are. Online marketplaces may seek to provide recommendations or advertisements that are relevant and targeted to specific user groups based on their shopping history or browsing history. Further, online marketplaces may seek to accurately verify delivery of an item or determine a particular user within a household associated with an individual item included in an order to better understand the user and provide more accurate recommendations. Problems arise however as users are not incentivized to provide such information nor are they provided opportunities to enable the uniqueness of their orders and preferences to reward them with unique opportunities offered by a vendor or online merchant.

BRIEF DESCRIPTION OF THE DRAWINGS

Various embodiments in accordance with the present disclosure will be described with reference to the drawings, in which.

DETAILED DESCRIPTION

Figure 1:
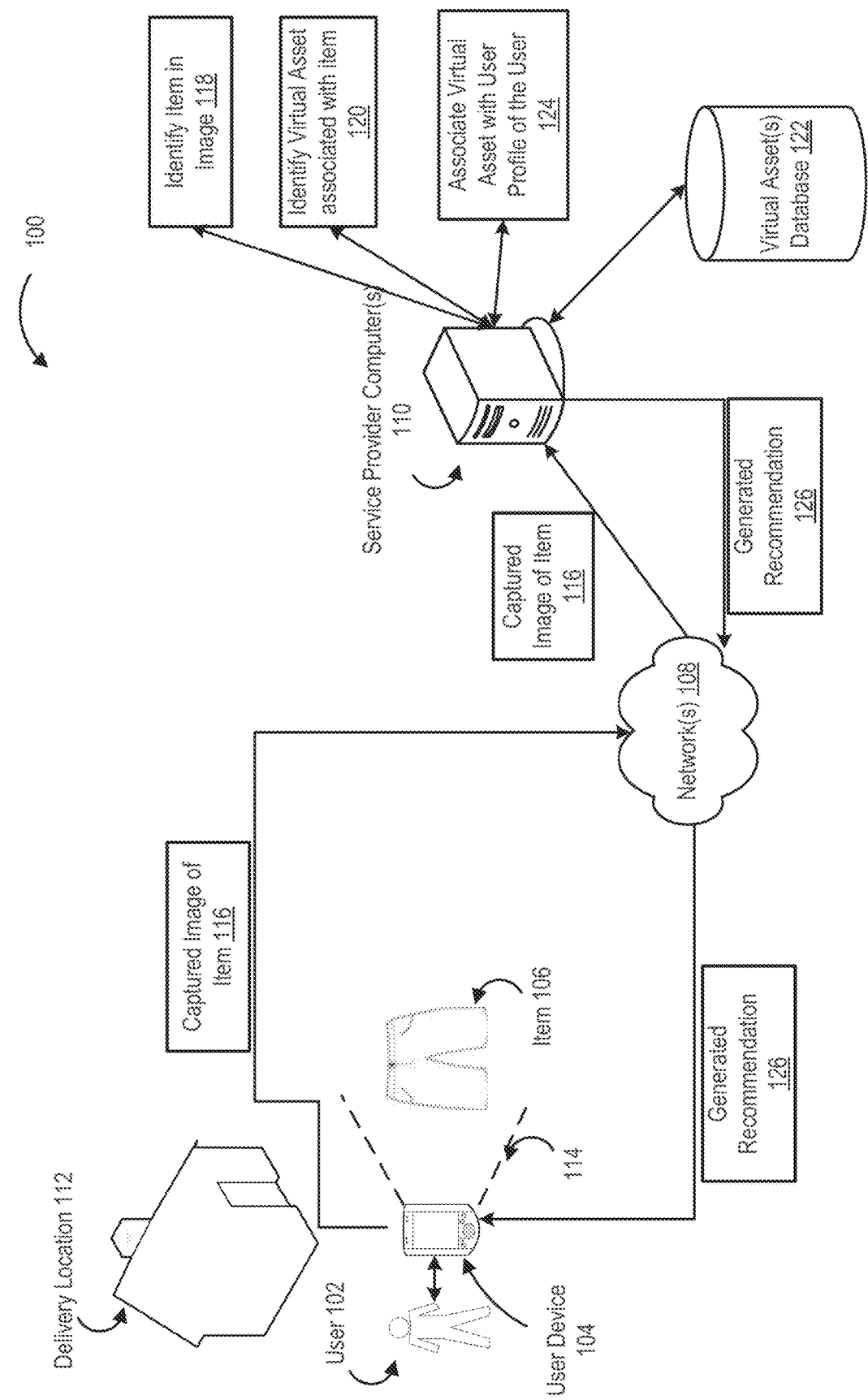
FIG. 1 illustrates an example workflow for an augmented reality service feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide an augmented reality feature for incentivizing users to share information which will enable a service provider to better serve the user by providing relevant and unique recommendations and advertisements. In particular, one or more service provider computers (or a service provider computer) that is configured to implement features described herein may maintain information that identifies an association of one or more virtual assets to items offered by an electronic marketplace. The virtual assets may be rewarded (associated) from an item to a user profile that corresponds to a user that has ordered an item and interacted with an item. For example, a user may order a hard drive, and upon the item being delivered, scan a bar code or quick response (QR) code associated with the item with a user device such as a mobile phone or tablet computer. In embodiments, the service provider computers may alter the association of the virtual asset from the item to the user profile that corresponds to the user in response to information or an indication including information of the interaction between the user's device and the bar code or QR code of the item. As used herein a "virtual asset" may refer to a virtual token, virtual creature, or other piece of data/metadata that represents a collectable and tradable entity. The service implementing the augmented reality features described herein may generate new virtual assets, discontinue virtual assets, and define various types and numbers available of each virtual asset. In embodiments, a user profile is maintained by the service provider computers for a plurality of users where each user profile includes information about collected or previously associated virtual assets, contact information (i.e., phone numbers, address, email address), and purchase information (i.e., bank account information, debit/credit card information) for ordering items.

In some embodiments, a user may interact with a delivered item, or an item in a store or venue by capturing an image or movie of the item or by interacting with the item in an augmented reality projected by the user's device. The image, movie, or indication of interaction may be transmitted to the service provider computer via available networks (i.e., the Internet or available mobile networks). In embodiments, the service provider computer may utilize image recognition techniques to identify an item in the image, movie, or indication of interaction via the augmented reality. For example, barcodes or labels associated with an item included in the image may be matched against a barcode or label database to identify the item in the image. In some examples, optical character recognition can be utilized to process labels or tags associated with an item in the image and matched to labels or tags of other items maintained in an item catalog by the service provider computers. In some embodiments, an image processing algorithm can fragment a picture into multiple portions and process each portion individually to identify items included in an image. In embodiments, a user can individually identify or tag regions or items included in the image to enable an algorithm to properly identify the item included in the image.

In accordance with at least one embodiment, the augmented reality service feature described herein may generate recommendations or advertisements that improve the user's shopping experience and are relevant by leveraging the virtual assets associated with each user profile. For example, a user's profile may identify associations with a number of virtual assets that normally correspond to aquatic items (swim wear, pool supplies, sun tan lotion, etc.). In embodiments, the service provider computer may generate a recommendation for other items offered by an electronic marketplace that also provide virtual assets normally associated with aquatic items. In some embodiments, the recommendation can include other similar virtual assets (i.e., a certain type of virtual asset) or an offer for a certain number of virtual assets. The service provider computers may generate advertisements for limited time offers that include rare or high quality virtual assets associated with a limited supply of items or with a vendor or venue. Based on the information maintained in the user profile, the recommendations and advertisements can be utilized by the service to incentivize the users to try new items, visit new places, or interact with items. Further, third party vendors, venues, and merchants may partner with the augmented reality service provider to provide limited offers to drive foot traffic and interest by associating a certain type or certain number of virtual assets to said vendors, venues, and merchants. For example, a merchant may offer a large number of virtual assets to a user that visits a brick and mortar store and interacts with an item during a certain date range.

In accordance with at least one embodiment, the augmented reality service feature, implemented by the service provider computer, may enable users to utilize their associated virtual assets as currency to purchase items or trade items. In some embodiments the virtual assets themselves can be traded or purchased by other users utilizing the augmented reality service feature. For example, a user may order or purchase an item offered by an electronic marketplace by providing currency and one or more virtual assets. In another example, the user may purchase the same item utilizing only the virtual assets. The service provider computer may update the associated virtual assets for a user profile when they are utilized in such a way. In yet another example, one user may trade a certain number of one type of virtual assets with another user for a certain number of another type of virtual assets or currency.

In accordance with at least one embodiment, when a user utilizes an associated user device to interact with a machine-readable identifier associated with an item, geo-location information about the user device may be transmitted to the service provider computer. As used herein a "machine-readable identifier" may include a barcode, a QR code, a radio frequency identifier (RFID) or RFID chip, a near field communication (NFC) component, a wireless network, or a media access control identifier. As used herein "geo-location information" may include suitable information for identifying physical coordinates for an object such as global positioning satellite information, RFID information, radio triangulation information, cell tower identity information, or long range navigation (LORAN) information. In accordance with at least one embodiment, the augmented reality service may generate and transmit recommendations or advertisements to a user's device based on their user profile and associated virtual assets. The recommendations or advertisements may identify and provide directions to a particular vendor, merchant, venue, or location within an area (neighborhood or park in a city). The service provider computers may utilize the geo-location information provided by a user device and other geo-location information provided by the intended destination to generate a best route or directions for a user to arrive at the intended destination.

In accordance with at least one embodiment, the service provider computers may utilize the offered or associated virtual assets to incentivize users or customers that order an item to verify delivery of an item by interacting with the item (i.e., scanning a barcode of the item with a user device) when the item is delivered. Such a verification of a delivery could result in a reward/association of a virtual asset tied to the item being associated with a user profile of the user for use as described herein. In embodiments, the user device of the user can transmit geo-location information about the user-device upon interacting with the machine-readable identifier of the item, interacting with the item in an augmented reality presented by the user device, or capturing an image of the item. The geo-location information of the user device along with geo-location information provided during a registration procedure for the delivery location may be compared to determine and verify delivery of the item. In some embodiments, an order may include multiple items intended for different recipients at a single delivery location (i.e., a family order intended for multiple people). The service provider computers may utilize the interactions of each family member with a particular item(s) included in the order to generate and/or update a user profile for that particular family member without receiving inappropriate or irrelevant data from the other family members.

In embodiments, the service provider computers can utilize the user profiles to generate targeted and relevant recommendations and/or advertisements for the user that benefit from the exclusive data provided by the user that has not been contaminated by data from other users in the same household or location. In some embodiments, the service provider computers may generate a recommendation for an item category that corresponds to a type of virtual asset collected or associated with a user profile of a user. In embodiments, the service provider computers may generate and transmit, to appropriate user devices, instructions or prompts for incentivizing the user to interact with an item and be rewarded additional virtual assets. For example, instructions may be generated and transmitted that prompt a user to upload an image of themselves wearing a recent shirt to a social media website. The prompt could be to write a review for the recently delivered item on an electronic marketplace web site that offered the item. In some embodiments, the service provider computers can associate virtual assets with one or more transportation entities, such as an unmanned aerial vehicle (UAV), a mobile robot, a particular vehicle, aquatic vehicle, or flying vehicle.

In accordance with at least one embodiment, the augmented reality service feature may generate and verify adherence to a delivery route for a delivery entity. In embodiments, the service provider computers may generate, maintain, and update a plurality of locations or spots within an area (neighborhood, town, city, etc.,) that are associated with one or more virtual assets (i.e., physical coordinates that are associated with virtual assets). In embodiments, the augmented reality service may implement a number of inter-actable spots or locations within an area to verify adherence of a delivery route by a delivery entity. For example, the spots or locations within an area may include a machine-readable identifier or emit a signal (wireless network or mobile telephone network) that can be briefly interacted with by a delivery entity's user device. The interaction can transmit geo-location information which can be compared to coordinates for the particular spot and thus verify adherence to a delivery route generated by the service provider computers. In some examples, the delivery entity's user device may periodically or continuously provided geo-location information which can be compared to the geo-location information for the multiple spots or locations within a delivery route to verify adherence to a generated route. In some embodiments, a delivery entity may be incentivized to adhere to the delivery route with the reward of virtual assets upon following the route or successfully delivering the item to a delivery location within a certain time period while following the generated route. In embodiments, the service provider computers may disassociate virtual assets currently associated with a delivery entity's user profile upon determining that the delivery entity did not adhere or follow a delivery route.

In accordance with at least one embodiment, the augmented reality feature service may, via the service provider computer, segment or cluster the user profiles for a plurality of users into one or more groups based on their similar associated virtual assets. In embodiments, the clustering or segmenting of the user profiles into one or more groups may be based in part on a threshold associated with each group and a number or type of virtual assets associated with each user profile. In some embodiments, the service provider computer may utilize the user groups to generate targeted recommendations and/or advertisements for items or services offered by an online marketplace, vendor, or venue. In embodiments, the recommendations and/or advertisements can be for items that other members of a group have previously ordered, reviewed, traded, etc., or for items that are associated with particular virtual assets that are similar or not already associated with a user's profile.

In accordance with at least one embodiment, the virtual assets associated with an advertisement campaign, sale, or item offer campaign can be utilized to determine the effectiveness or contribution of said sale, offer, or campaign. For example, if an advertisement campaign offers a particular type of virtual asset for each person that orders an associated item within a certain time range, then the number of user profiles associated with the particular type of virtual asset can be utilized to determine the contribution of the campaign. In some embodiments, a voice-activated component or a voice-activated component of a user device may be utilized to query the augmented reality service feature, via the service provider computers and a network, for recommendations for items, venues, or vendors. For example, a user may interact with the voice-activated component to query for a recommendation for an item that is associated with a particular type of virtual asset. In response, the service provider computer may perform a mapping look up operation to determine one or more items, services, or vendors that are associated with the type of virtual asset in question and respond to the user via the voice-activated component.

In embodiments, the voice-activated component may comprise a microphone that is associated with a speaker component or the voice-activated component and the speaker component may be separate components that work in conjunction to receive and process voice commands and provider responses to queries provided by a user. In embodiments, an application of a user device may utilize auditory components of the user device to communicate with the user about item offers and verifying candidate values for features utilizing two way communication techniques. In embodiments, a dialog may occur between a voice-activated component, software application, etc., and a user. A dialog may include a sequence or series of speech expressions that may include system-generated and user-uttered speech. For example, the user may speak a command, and the voice-activated component may respond with a speech message asking for clarification. When the service has received enough information, it may begin the process of identifying an item category and features for a potential offered item, and generate candidate values with corresponding candidate scores for the identified features. Text may be identified from a query provided by a user using a speech to text process.

FIG. 1 illustrates an example workflow for an augmented reality service feature, in accordance with at least one embodiment. FIG. 1 depicts a workflow 100 that illustrates identifying an item in an image provided by a user device and associating a virtual asset with a user profile that corresponds to the user device. FIG. 1 includes a user 102 utilizing a user device 104 (i.e., a mobile phone, a tablet computer, a gaming device, etc.,) to capture an image of an item 106 that can be transmitted via networks 108 to service provider computers 110, in accordance with at least one embodiment. In embodiments, the user 102 may have ordered the item 106 for delivery to a delivery location 112 (i.e., the user's 102 home). As described herein, to incentivize the user 102 to verify delivery and interact with the ordered item 106, the service provider computers 110 may associate a virtual asset with a user profile of the user 102. In embodiments, the user 102 may utilize the user device 104 to capture 114 an image of the item 106. In some examples, the user device 104 may capture a movie, a live stream, or interact with the item 106 via an augmented reality projected or presented by the user device 104.

In embodiments, the user device 104 may transmit the captured image of the item 116 to the service provider computers 110 via networks 108. In some examples, the user device 104 may also transmit geo-location information for the user device 104 as metadata or tag the captured image of the item 116 with the geo-location information for verifying delivery or tracking the item 106. In accordance with at least one embodiment, the service provider computers 110 may identify a particular item in the image 118. As described herein, the one or more service provider computers 110 may utilize image and item recognition techniques and algorithms to identify the item in the provided image 116. The service provider computers 110 may identify a virtual asset associated with the item 120 by performing a look up operation or using other suitable techniques to identify a mapping between the identified item and a virtual asset.

In embodiments the service provider computers 110 may communicate and maintain the status and association of virtual assets to user profiles and items in a database such as virtual assets database 122. In accordance with at least one embodiment, the service provider computers 110 may update or alter the association of the virtual asset associated with the item to associate the virtual asset with a user profile 124 of the user 102 that provided the image of the item 116. In some embodiments, the service provider computers 110 may generate a recommendation 126 that is configured to be transmitted and presented to the user device 104 via networks 108. In accordance with at least one embodiment, the service provider computers 110 may include one or more other items that include virtual assets similar to the virtual asset associated with the item 120, may recommend vendors or venues that are within a certain distance of the user device 104 and user 102 utilizing the previously transmitted geolocation information for the user device 104, or provide advertisements for products and services that are relevant to the user as determined by the user's profile. For example, the item 106 in FIG. 1 represents a pair of shorts and the generated recommendation 126 can be for a matching shirt that also includes a virtual asset similar to the virtual asset associated with the item 120.

Figure 2:
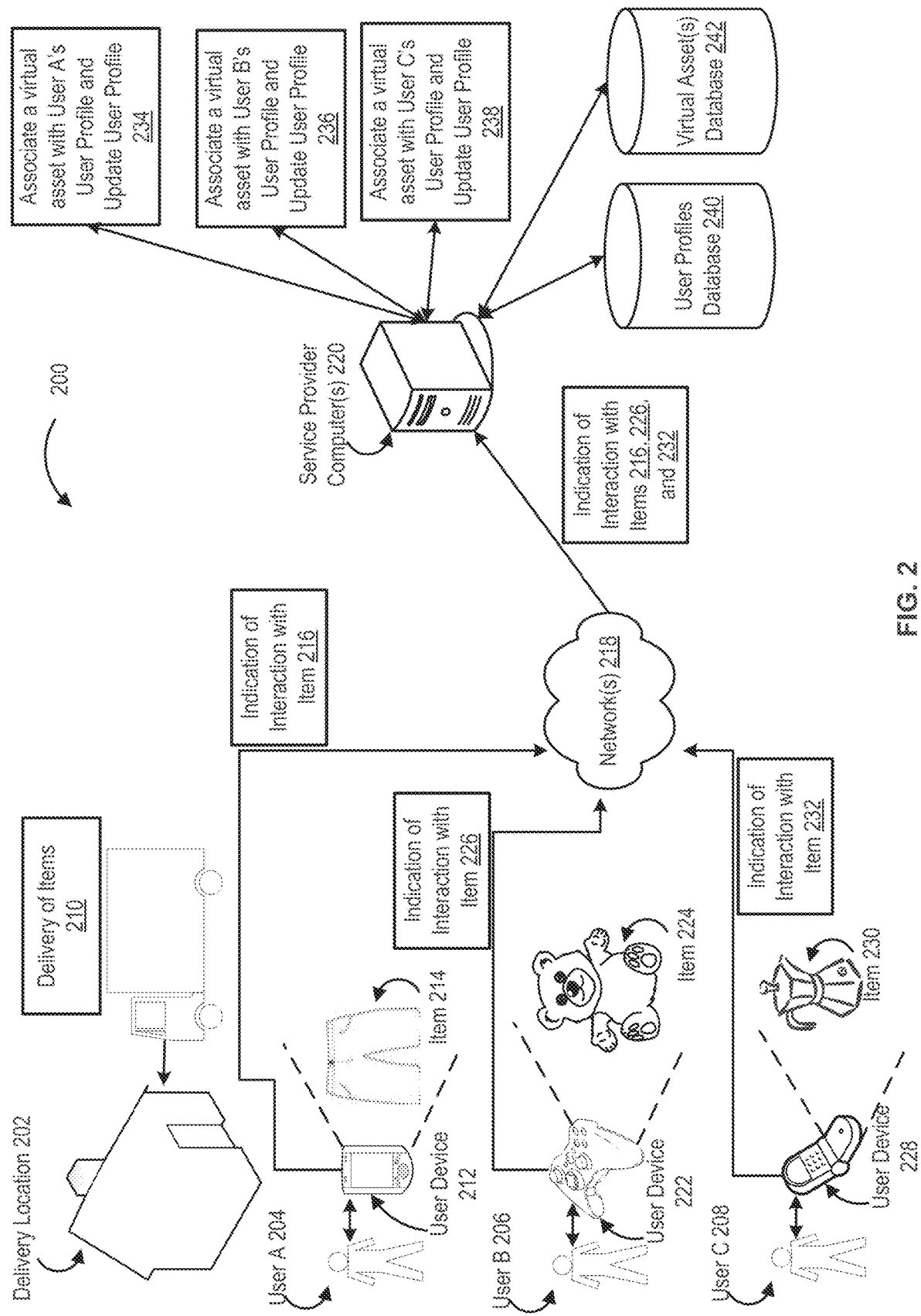
FIG. 2 illustrates an example workflow for an augmented reality service feature for generating one or more user profiles and verifying delivery of items, in accordance with at least one embodiment.

FIG. 2 illustrates an example workflow for an augmented reality service feature for generating one or more user profiles and verifying delivery of items, in accordance with at least one embodiment. FIG. 2 depicts an example workflow 200 for verifying delivery of an order and generate one or more user profiles for one or more users associated with a delivery location 202. In embodiments, users 204, 206, and 208 may place an order for one or more items to be delivered 210 to a corresponding delivery location 202 (i.e., a user's home). As described herein, a plurality of users living or residing in a location may place an order for one or more items where an item may be meant or intended for only a particular user and not for use or consumption by the other associated users. In such cases, a service provider computer may benefit and provide better recommendations and advertisements by generating unique and personalized user profiles for each user in the multi-user residence. As illustrated in FIG. 2, user A 204 may utilize user device 212 (a tablet computer) to interact with item 214. In embodiments, the user device 212 of user A 204 may interact with the item 214 by scanning a bar code, a QR code, or interacting with an RFID chip associated with the item.

In accordance with at least one embodiment, an indication of the interaction with the item 216 may be transmitted, via networks 218 to service provider computers 220. Similarly, user B 206 may utilize user device 222 (a video game device) to interact with another item 224 from the delivery of items 210. In embodiments, the user device 222 may interact with the item 224 by interacting with a software application or augmented reality presentation that is projected via the user device 222 such as by clicking, pointing, swiping, or otherwise interacting with the user device 222 to simulate an action in the augmented reality presentation. As described above, the indication of the interaction 226 may be transmitted via the networks 218 to service provider computers 220. The workflow 200 also includes user C 208 using a user device 228 (a mobile phone) to interact with an item 230. In some examples, the user device 228 may capture an image or movie of the item 230 and the indication of the captured image or movie (interaction 232) may be transmitted via networks 218 to service provider computers 220. In embodiments, the user device may include a virtual reality (VR) presentation device that may be wireless, cordless, or a wearable device.

In accordance with at least one embodiment, the indications of interactions 216, 226, and 232 may be utilized to associate a virtual asset with User A's user profile and update User A's profile 234. Similar processes may occur for User B's profile 236 and User C's profile 238. In embodiments, the generation and maintenance of separate user profiles for each user A, B, and C (204, 206, and 208) can result in a more personalized shopping experience and recommendation/advertisement generation. In accordance with at least one embodiment, the service provider computers 220 may communicate with a user profiles database 240 and virtual assets database 242 to generate and maintain user profiles and associate virtual assets to appropriate user profiles as described herein. For example, upon user A's 204 indication of interaction with item 216 is received by the service provider computers 220, an association of a virtual asset may be added to user A's user profile. Similar processes may occur for user B 206 and user C 208.

Figure 3:
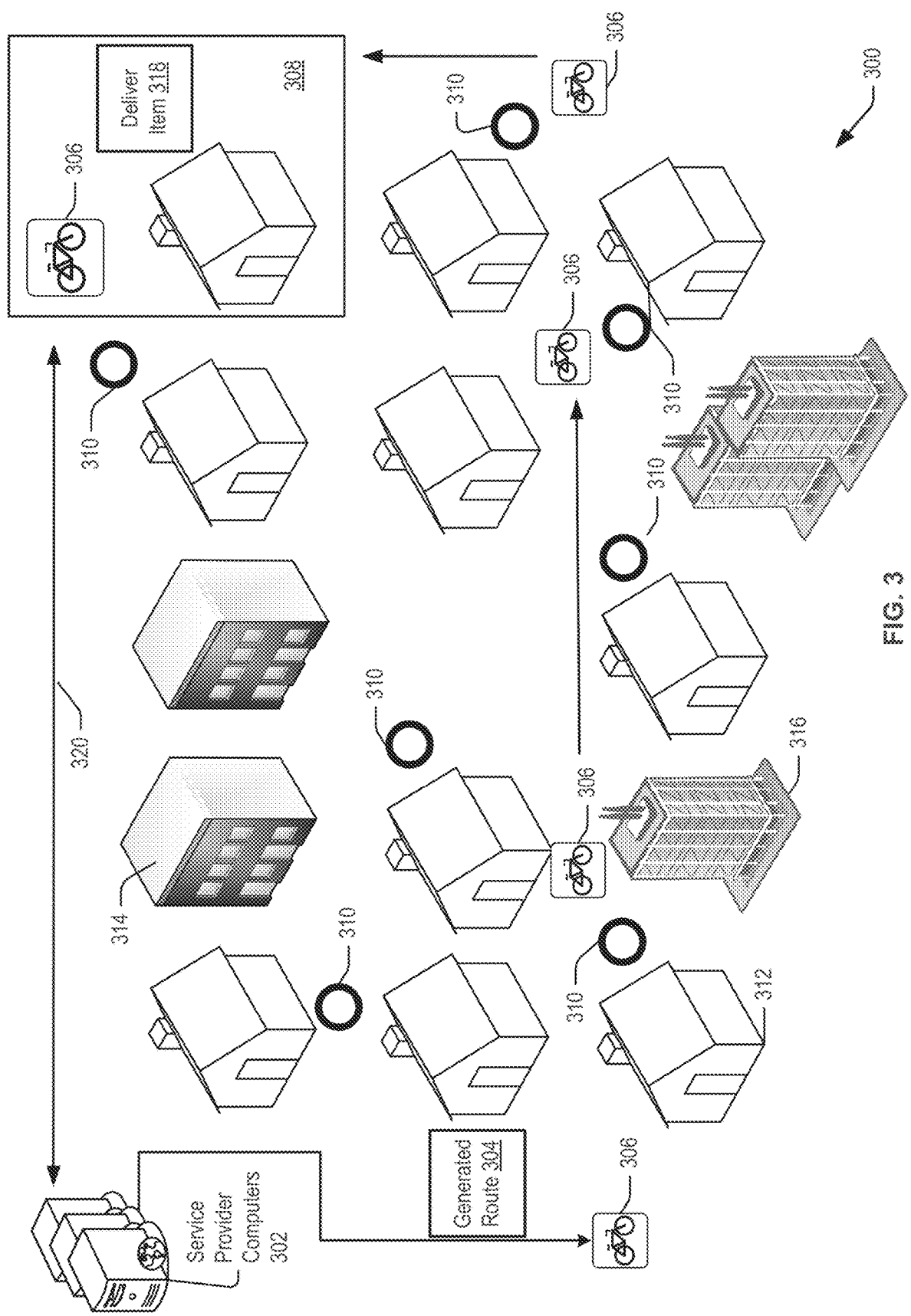
FIG. 3 illustrates an example workflow for an augmented reality service feature for verifying adherence to a delivery route by a delivery entity during delivery of an item, in accordance with at least one embodiment.

FIG. 3 illustrates an example workflow for an augmented reality service feature for verifying adherence to a delivery route by a delivery entity during delivery of an item, in accordance with at least one embodiment. The workflow 300 includes service provider computers 302 transmitting a generated route 304 or route instructions to a delivery entity 306 to deliver an item to a delivery location 308. As described herein, the service provider computers 302 may maintain and update one or more spots or particular locations 310 that serve as guideposts or check in spots for verifying whether the delivery entity 306 is adhering to the generated route 304 while delivering an item to location 308. In embodiments, the delivery entity 306 may have a user device that continuously transmits corresponding geo-location information which can be compared to the known geo-locations for the one or more spots or particular locations 310 in the area. The area may include one or more homes 312, warehouses 314, or offices 316. In some embodiments, users other than the delivery entity 306 may interact with a spot or particular location 310 located in an area or associated with a vendor, merchant, venue, or other area (not depicted) to be rewarded or have their user profile associated with a virtual asset that is further associated with the spot or location. In accordance with at least one embodiment, the service provider computers 302 may generate, maintain, and update one or more lifecycles or paths for items that are delivered to users utilizing the virtual assets that are associated with corresponding user profiles and geo-location information for the user device that is reporting an interaction between the user device and the item. For example, an item may be delivered to a user, interacted with by the user's device, and information bout the interaction, including geo-location information, may be provided to the service provider computers 302. As described herein, the service provider computer 302 may associate a virtual asset with a user profile of the user based on the interaction where the virtual asset is identified by the item it is associated with. The user may, at a later time, trade or sell the delivered item to a second user. The second user may also interact with the item and be rewarded with a virtual asset that is associated with their corresponding user profile. When the second user interacts with the item, information about the interaction and geo-location information for the second user's user device may be transmitted to the service provider computers 302. In embodiments, the service provider computers 302 may generate one or more paths or lifecycles for the delivered item utilizing the periodic or continual interactions by user devices with an item and the association of virtual assets with the corresponding user profiles. In some embodiments, the paths generated and maintained for the lifecycle of an item may be utilized to update the generated delivery paths for the delivery entity 306.

In accordance with at least one embodiment, as the delivery entity 306 follows the generated route 304 to deliver the item, the service provider computers 302 may reward or associate one or more virtual assets to a user profile that corresponds to the delivery entity 306. In some embodiments, the user device of the delivery entity 306 may interact with the spots or particular locations 310 by utilizing a network connection, NFC, RFID, mobile telephone networks, or other suitable communication techniques that would allow the device and spot to communicate. This type of communication scheme can allow for efficient delivery by the delivery entity 306 while still verifying adherence to the generated route 304 from the service provider computers 302. In accordance with at least one embodiment, upon the delivery entity delivering the item 318 a delivery communication 320 may occur between the user device of the delivery entity 306 and the service provider computers 302 resulting in additional or extra virtual assets being associated with the user profile of the delivery entity 306. At this point the service provider computers 302 may generate new or different delivery route instructions for another delivery to another location for the delivery entity 306.

Figure 4:
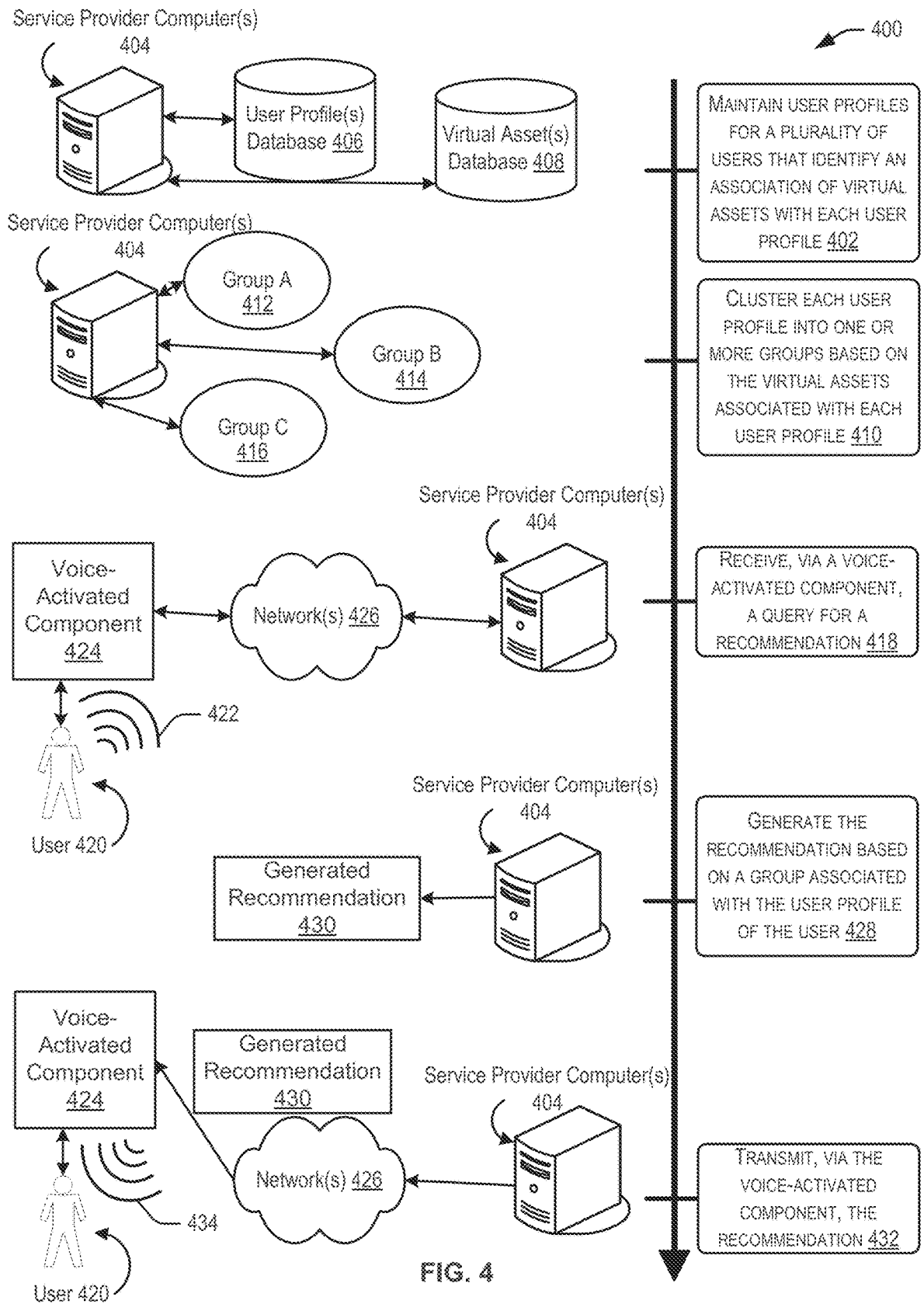
FIG. 4 illustrates an example workflow for an augmented reality service feature for generating a recommendation for an item based on a query provided via a voice-activated component.

FIG. 4 illustrates an example workflow for an augmented reality service feature for generating a recommendation for an item based on a query provided via a voice-activated component. The workflow 400 includes maintaining user profiles for a plurality of users that identify an association of virtual assets with each user profile at 402. For example, the service provider computers 404 may communicate with one or more databases such as user profiles database 406 and virtual assets database 408 to maintain the user profiles and associations of virtual assets with each profile. In embodiments, the service provider computers 404 may cluster each user profile into one or more groups based on the virtual assets associated with each user profile at 410. For example, the service provider computers 404 may cluster the one or more user profiles for a subset of users into three groups, Group A 412, Group B 414, and Group C 416. In embodiments, each group (412, 414, and 416) may represent one or more users that are associated with a particular type and/or number of virtual assets and therefore represent similar interests, shopping habits, browsing habits, etc. In embodiments, the user groups can be utilized to generate targeted and relevant recommendations and advertisements for group members.

The workflow 400 may include receiving, via a voice-activated component, a query for a recommendation at 418. For example, a user 420 may provide a speech query 422 to a voice-activated component 424. In accordance with at least one embodiment, the voice-activated component 424 may be configured to perform a speech to text operation and transmit the text, via networks 426 to the service provider computers 404. The workflow 400 may include generating a recommendation based on a group associated with the user profile of the user at 428. For example, the service provider computers 404 may identify an item included in the text from the query 422 or may generate a recommendation 430 based in part on the group (412, 414, or 416) that the user 420 belongs to.

For example, the generated recommendation 430 may include an item that is associated with a virtual asset that is popular among group members that the user profile of the user 420 is associated with. In accordance with at least one embodiment, the workflow 400 may transmit, via the voice-activated component, the recommendation at 432. For example, the service provider computers 404 may communicate the generated recommendation 430, via networks 426, to the voice-activated component 424. In embodiments, the voice-activated component 424 may be configured, or utilize a separate speaker component, to respond 434 to the query 422 posed by the user 420 with a recommendation. In embodiments, the generated recommendation may include an item, an offer for an item or sale, directions to a venue, merchant, or vendor, or instructions for interacting with an item that will result in a virtual asset being associated with a user profile of the user 420.

Figure 5:
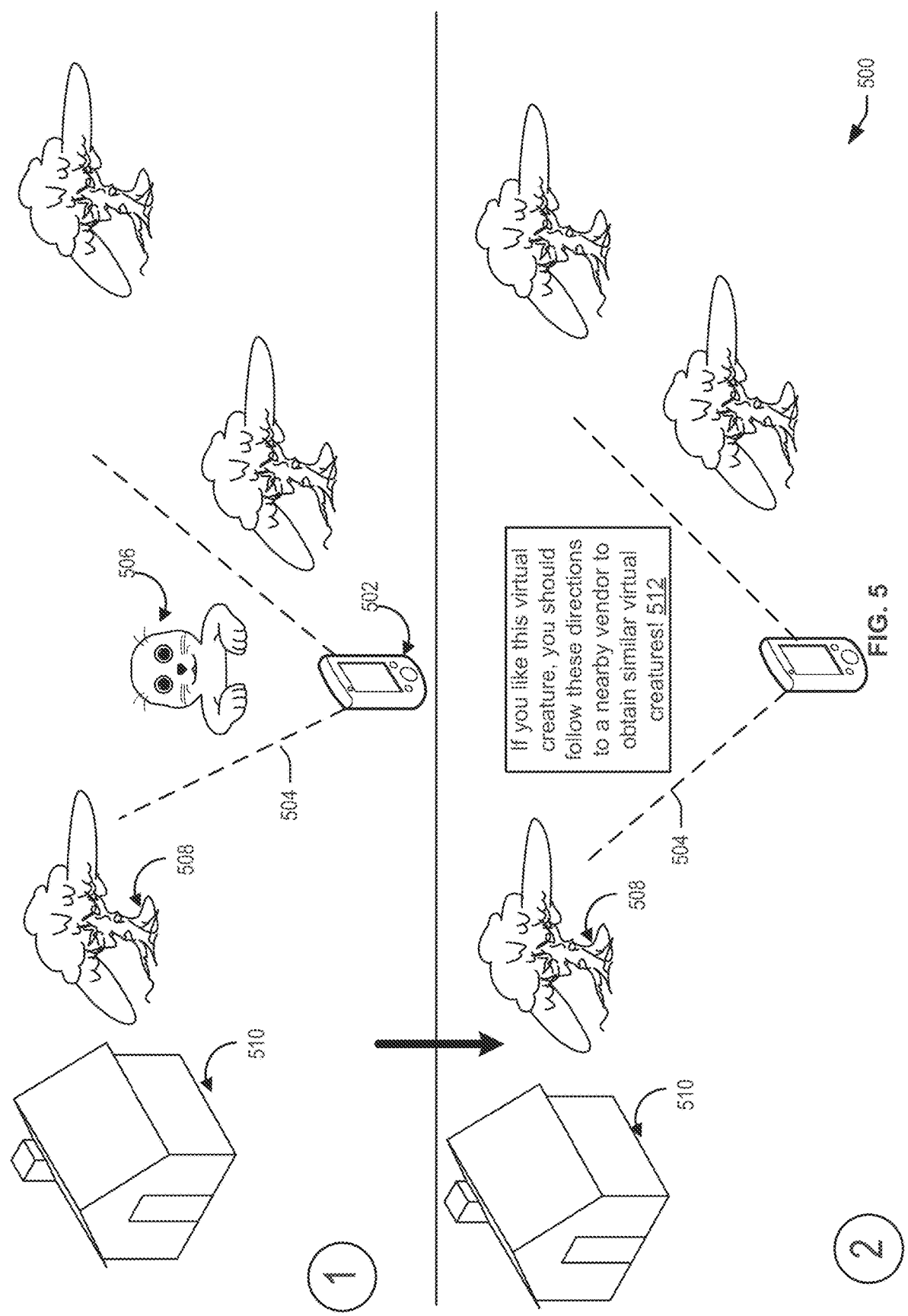
FIG. 5 illustrates an example workflow for an augmented reality service feature for generating and transmitting a recommendation in an augmented reality presentation, in accordance with at least one embodiment.

FIG. 5 illustrates an example workflow for an augmented reality service feature for generating and transmitting a recommendation in an augmented reality presentation, in accordance with at least one embodiment. The workflow 500 illustrates two steps, 1 and 2, for interaction by a user with a virtual asset or creature that is presented in an augmented reality projected by a user device. As illustrated, in step 1, a user device 502 may project 504 an augmented reality presentation that includes a virtual asset or creature 506. In embodiments, the user device 502 may be configured to project 504 the augmented reality presentation in the surrounding environment that may include one or more trees 508 or structures 510 (i.e., a house). In embodiments, the user may interact with the virtual asset or creature 506 in the augmented reality presentation 504 via the user device 502.

Information such as an indication of the interaction with the virtual asset or creature 506 may be transmitted to service provider computers. In accordance with at least one embodiment, the indication may include geo-location information for the user device 502. The service provider computers may utilize the indication and the geo-location information to generate a recommendation for a nearby vendor or merchant to obtain similar virtual assets or creatures 506. In embodiments, the service provider computers may generate and transmit the recommendation or notification 512 that is configured to be presented in the augmented reality presentation 504. By generating and presenting the recommendation this way the user may stay immersed in the augmented reality presentation, which may represent a video game environment, and still be informed with targeted recommendations and advertisements with offers that may be beneficial and/or useful to the user. In embodiments, the recommendation or notification 512 may include instructions or directions to interact with other items in the augmented reality presentation or directions for arriving at a recommended location.

FIGS. 6-10 illustrate example flows for an augmented reality feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. AS noted above, the code may be stored on a computer-readable storage medium, for example, in the form of a computer program including a plurality of instructions executable by one or more processors. The computer-readable storage medium may be non-transitory.

Figure 6:
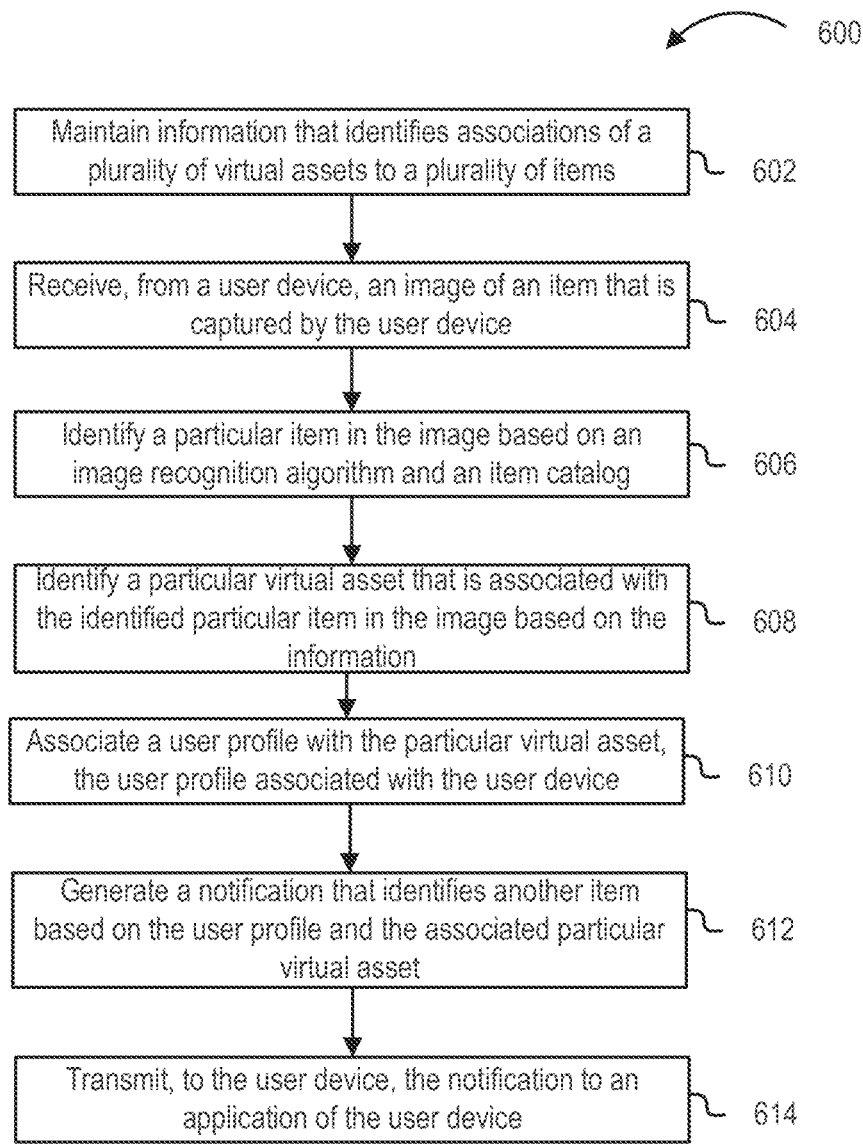
FIG. 6 illustrates an example flow chart for an augmented reality service feature, in accordance with at least one embodiment.
Figure 9:
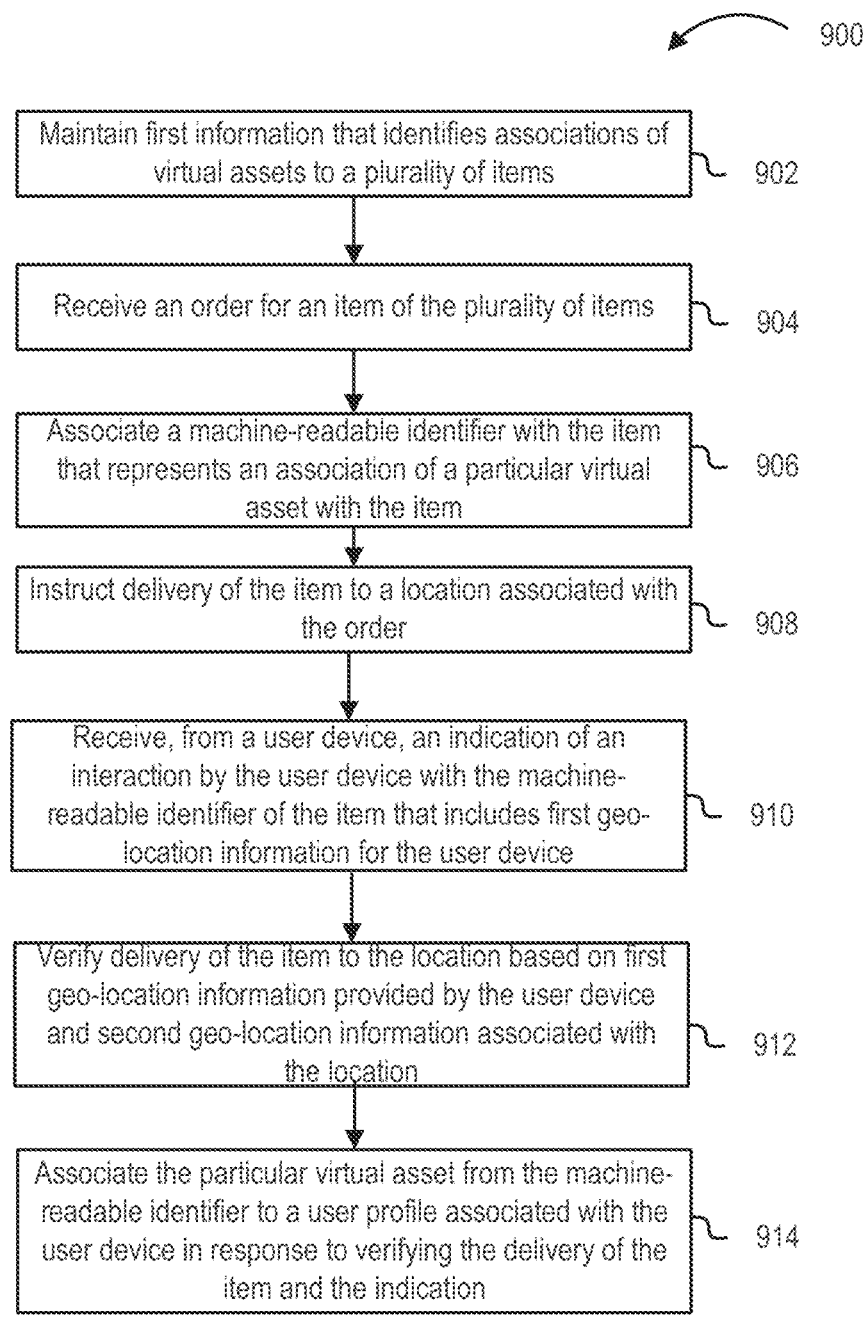
FIG. 9 illustrates an example flow chart for an augmented reality service feature, in accordance with at least one embodiment.
Figure 10:
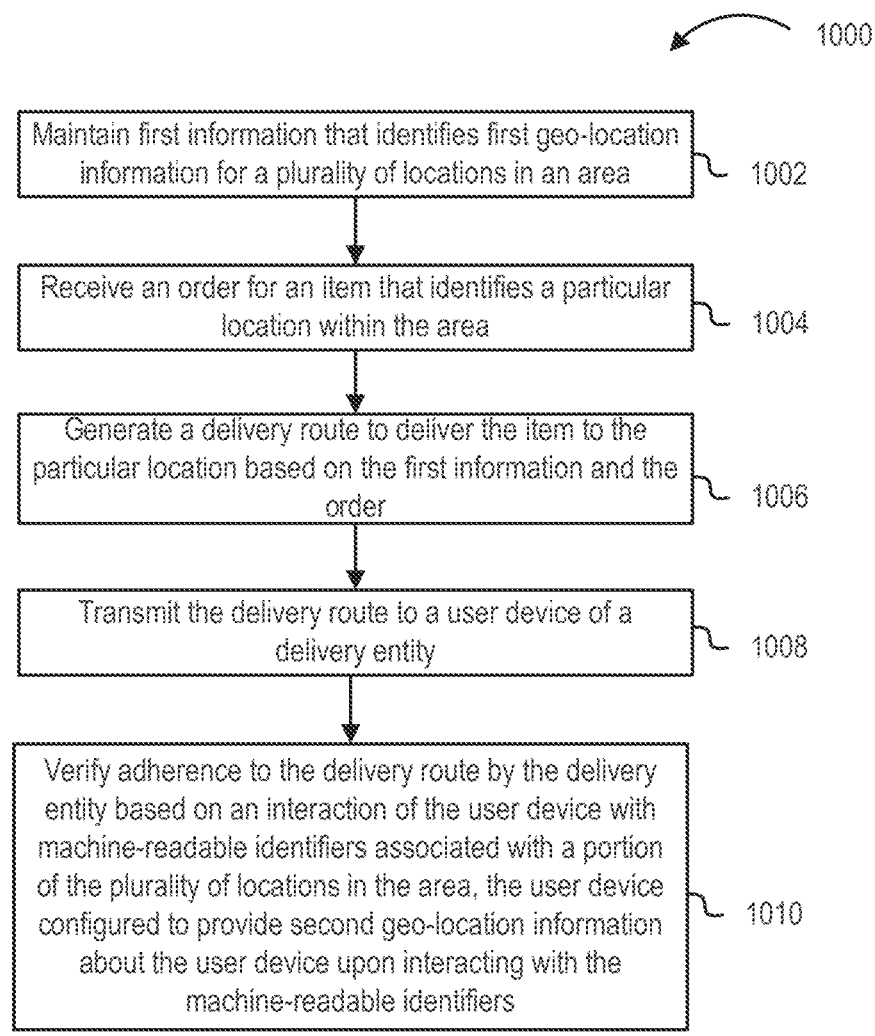
FIG. 10 illustrates an example flow chart for an augmented reality service feature, in accordance with at least one embodiment.
Figure 11:
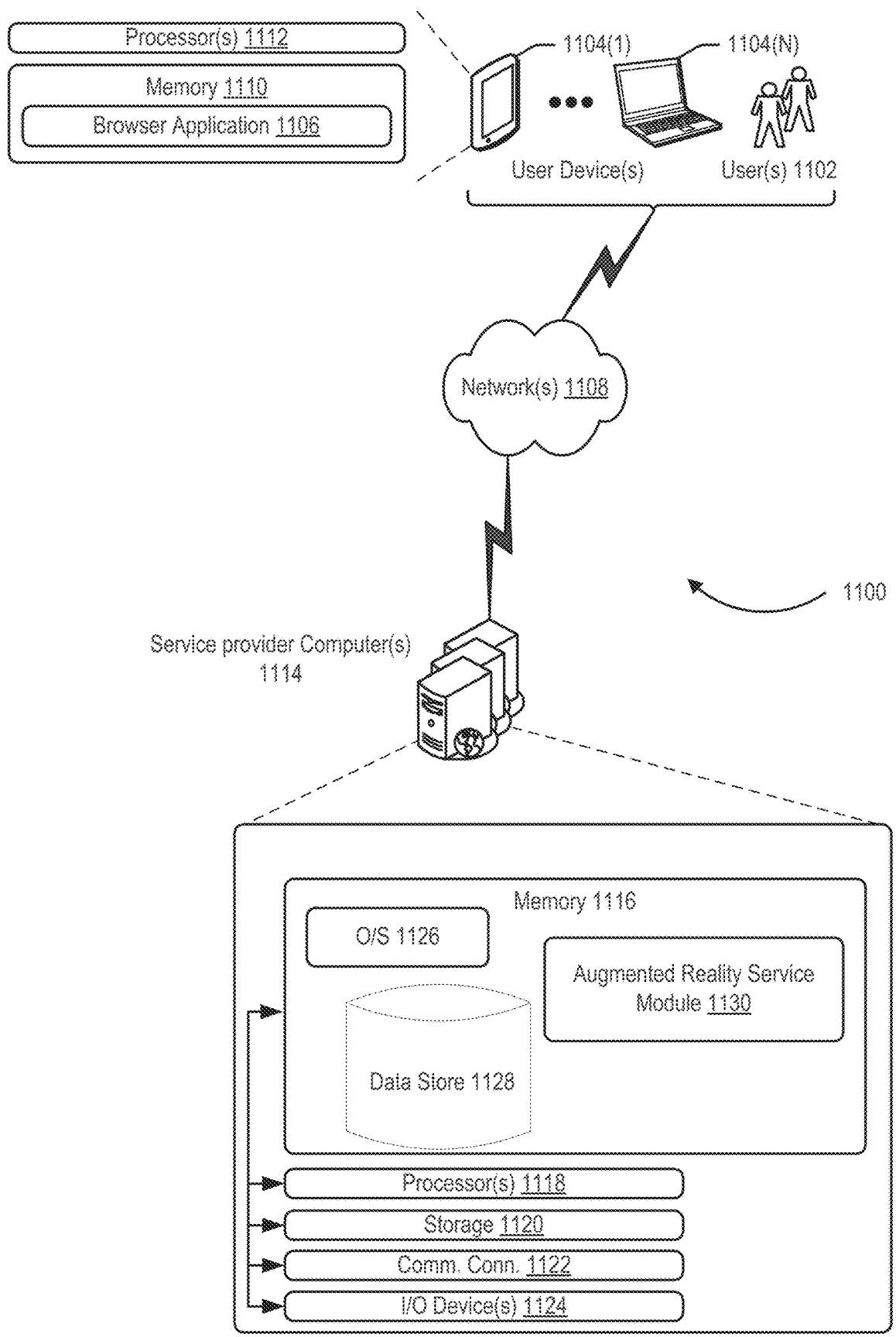
FIG. 11 illustrates an example architecture for implementing an augmented reality service feature, in accordance with at least one embodiment.

In some examples, the one or more service provider computers (one or more service provider computers 1114) utilizing at least the augmented reality service module 1130 shown in FIG. 11 may perform the processes 600, 700, 800, 900, and 1000 of FIGS. 6-10. In FIG. 6 the process 600 may include maintaining information that identifies associations of a plurality of virtual assets to a plurality of items at 602. For example, the information may indicate the an individual and unique virtual asset is associated with a pair of shoes offered by an electronic marketplace. In some examples, the association of a virtual asset to item may be a one to one relationship while in other examples multiple unique virtual assets may be associated with an item thus implementing a one to many relationship. The process 600 may include receiving, from a user device, an image of an item that is captured by the user device at 604. In some embodiments, the user device may capture the image of the item while the user interacts with the item in an augmented reality presented by the user device. In embodiments, the user device may capture a movie, or stream of data that includes the item in question.

The process 600 may include identifying a particular item in the image based on an image recognition algorithm and an item catalog at 606. In some examples, the item catalog may be maintained by an electronic marketplace. The image recognition algorithm may utilize unique features such as a bar code or label of the item in the image to compare to other bar codes or labels included in the item catalog to identify the image in the item. The process 600 may include identifying a particular virtual asset that is associated with the identified particular item in the image based on the information at 608. In embodiments, the one or more service providers may perform a map look up operation to identify the virtual asset associated with the item identified in the captured image. The process 600 may include associating a user profile with the particular virtual asset where the user profile is associated with the user device at 610.

In embodiments, the service provider computers may alter or change the association of the virtual asset to reflect the association going from the item to a user profile thereby rewarding the user for interacting with the item. In some examples, once an association has been updated for an item a subsequent interaction with the item would not result in a further update to the association of the virtual asset. However, in some examples, multiple users may interact with the same item and be rewarded with a virtual asset that is associated with the item. As described herein, the virtual assets may be used as currency, for trading, or for achieving goals implemented by a service provider or electronic marketplace. The user profile may be generated for a user and associated with the user and/or user device utilized by the user to interact with the item. The process 600 may include generating a notification that identifies another item based on the user profile and the associated particular virtual asset at 612. In embodiments, the service provider computers may generate a recommendation for another item offered by an electronic marketplace or vendor utilizing the user profile that indicates current associated virtual assets as well as the information identifying the newly associated virtual asset. In some embodiments, the recommendation may be for other items, vendors, or venues that reward similar virtual assets. The process 600 may conclude at 614 by transmitting, to the user device, the notification to an application of the user device. In embodiments, the notification may be configured for presentation via an augmented reality presented or projected by the user device utilized to capture the image of the item. In some examples, the notification may be transmitted via other communication channels such as an email, a short message service (SMS) text message, or a notification to a software application implemented by the user device.

Figure 7:
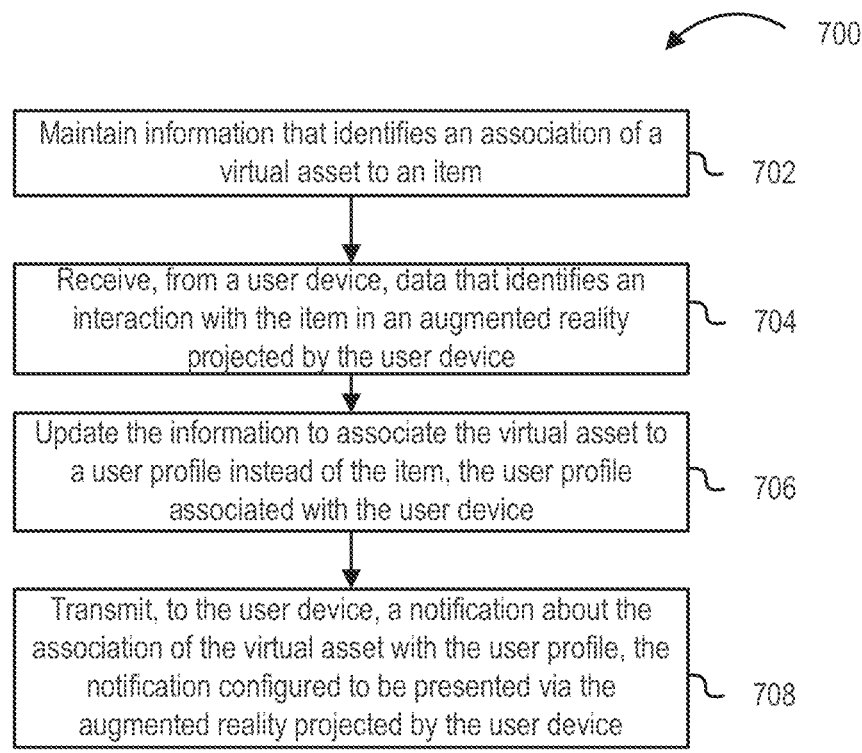
FIG. 7 illustrates an example flow chart for an augmented reality service feature, in accordance with at least one embodiment.

In FIG. 7, the process 700 may begin by maintaining information that identifies an association of a virtual asset to an item at 702. In embodiments, the one or more service provider computers may update the tagging or association of virtual assets to items, portions of a web page or website, or venue/vendor locations in a database. The process 700 may include receiving, from a user device, data that identifies an interaction with the item in an augmented reality projected by the user device at 704. For example, the user may click, rotate, or otherwise interact with the item via the augmented reality and user device that results in data being transmitted to the one or more service provider computers that identify the interaction with the item. The process 700 may include updating the information to associate the virtual asset to a user profile instead of the item at 706. In embodiments, the user profile may be associated with the user device. In some examples, a user may provide user device information and other contact information in a registration process or step when first interacting with the augmented reality feature service described herein. The process 700 may conclude at 708 by transmitting, to the user device, a notification about the association of the virtual asset with the user profile. The notification may be configured to be presented via the augmented reality projected by the user device thereby not interrupting their current search or interaction of items for more virtual assets.

Figure 8:
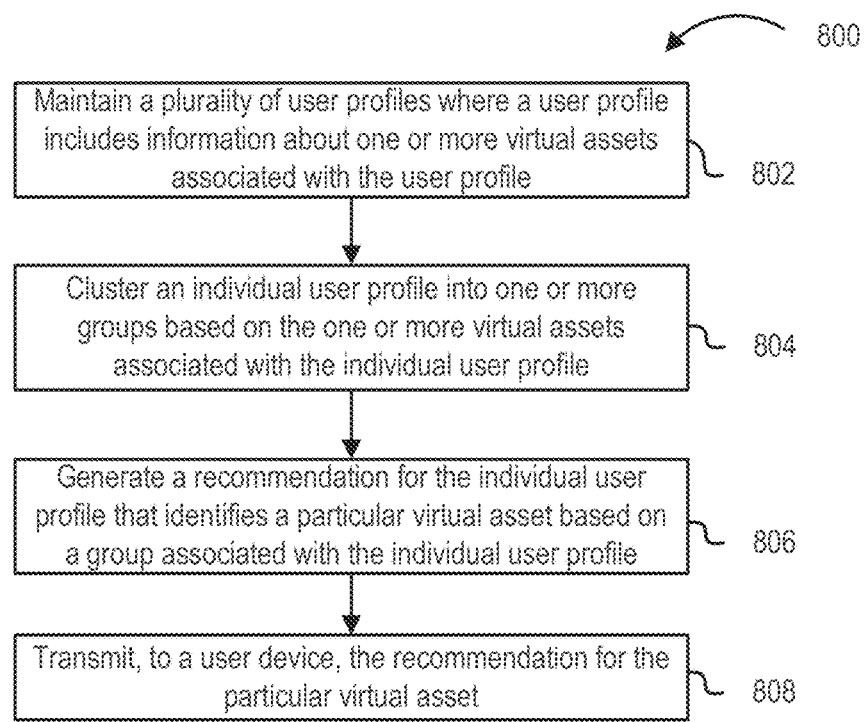
FIG. 8 illustrates an example flow chart for an augmented reality service feature, in accordance with at least one embodiment.

In FIG. 8, the process 800 may begin by maintaining a plurality of user profiles where a user profile includes information about one or more virtual assets associated with the user profile at 802. In embodiments, the user profile may include information that identifies collected or previously associated virtual assets, contact information (i.e., phone numbers, address, email address), and purchase information (i.e., bank account information, debit/credit card information) for ordering items. The process 800 may include clustering an individual user profile into one or more groups based on the one or more virtual asset associated with the individual user profile at 804. In embodiments, a user profile may be clustered into one or more groups consisting of other user profiles that represent other users that have collected or are associated with similar virtual assets. In some embodiments, a type or number of virtual assets may be compared to a threshold for a group before a user profile is clustered into the group.

The process 800 may include generating a recommendation for the individual user profile that identifies a particular virtual asset based on a group associated with the individual user profile at 806. In embodiments, the one or more service provider computers may identify a virtual asset that may be of interest or relevant to a user represented by the user profile based on the already associated virtual assets. The process 800 may conclude at 808 by transmitting, to a user device, the recommendation for the particular virtual asset. In embodiments, the recommendation may identify one or more items offered by an electronic marketplace that, upon purchase, award an association of the particular virtual assets. In some embodiments, the recommendation may identify a vendor or venue that offers items associated with the particular virtual asset or that when visited by the user may award the association of the particular virtual asset. In some embodiments, the recommendation may include a prompt or instructions for a user to interact with a particular item (i.e., try a shoe on, wear a coat) at a vendor, merchant, or venue prior to awarding the association of the particular virtual asset with the user profile.

In FIG. 9, the process 900 may begin by maintaining first information that identifies associations of virtual assets to a plurality of items at 902. In embodiments, the items may be offered by an electronic marketplace, vendor, or online marketplace. The process 900 may include receiving an order for an item of the plurality of items at 904. The process 900 may include associating a machine-readable identifier with the item that represents an association of a particular virtual asset with the item at 906. In embodiments, the one or more service provider computers may tag, map, or otherwise alter metadata associated with an item to associate the virtual asset with the item. For example, a database may be maintained that indicates virtual assets associated with each item offered by an electronic marketplace. Administrators associated with the augmented reality feature service described herein may update, move, or alter the associations of virtual assets to correspond to particular geo-locations (i.e., venues, vendors, or particular locations in an area such as a city).

The process 900 may include instructing the delivery of the item to a location associated with the order at 908. The process 900 may include receiving, from a user device, an indication of an interaction by the user device with the machine-readable identifier of the item at 910. In embodiments, the indication may include first geo-location information for the user device that identifies a physical location of the user device in an area. In some examples, the interaction by the user device with the machine-readable identifier may include a scan of a barcode, an interaction with a radio frequency identification chip, or capturing an image or video of the item via an application of the user device. The process 900 may include verifying delivery of the item to the location based on the first geolocation information provided by the user device and second geo-location information associated with the location at 912. In embodiments, the one or more service provider computers may utilize the coordinates included in the first and second geo-location information to verify delivery of the item. The process 900 may conclude at 914 by associating the particular virtual asset from the machine-readable identifier to a user profile associated with the user device in response to verifying the delivery of the item and the indication. In embodiments, users are incentivized to interact with the delivered items thereby enabling the service providers to verify delivery of the item and to reward an association of a virtual asset to the user profile of the user. As described herein, the user may utilize the virtual assets as currency to purchase or trade for other items offered by other users or by an electronic marketplace.

In FIG. 10, the process 1000 may begin by maintaining first information that identifies first geo-location information for a plurality of locations in an area at 1002. For example, the one or more service provider computers may maintain physical coordinates for a plurality of locations within a city, town, or neighborhood. The one or more service provider computers can update the coordinates to acquire new spots or locations, alter coordinates for existing locations, or maintain the coordinates. The process 1000 may include receiving an order for an item that identifies a particular location within the area at 1004. For example, the one or more service provider computers may receive an order for an item that requests delivery to a location such as a user's home. The process 1000 may include generating a delivery route to deliver the item to the particular location based on the first information and the order at 1006. In embodiments, the one or more service provider computers may generate a route that ensures efficient delivery of the item to the particular location and utilizes the coordinates for the spots or locations within the area to verify adherence to the generated route.

The process 1000 may include transmitting the delivery route to a user device of a delivery entity at 1008. For example, the delivery route instructions may identify a particular route from a current location of the delivery entity to the particular location that corresponds to the delivery location for the user that placed an order. In embodiments, the delivery route instructions may take into account the type of transportation being utilized by the delivery entity (i.e., walking, bicycle, motorcycle, vehicle, etc.). The process 1000 may conclude at 1010 by verifying adherence to the delivery route by the delivery entity based on an interaction of the user device with machine-readable identifiers associated with a portion of the plurality of locations in the area. In embodiments, the user device of the delivery entity is configured to provide second geo-location information about the user device upon interacting with the machine-readable identifiers.

In some embodiments, the delivery entity may interact, via their user device, with the spots or locations' machine-readable identifiers by merely passing within a certain distance of the machine-readable identifier utilizing an RFID scanner or by utilizing near field communication (NFC) technologies. In some embodiments, each spot or particular location in an area that is maintained by the service provider may emit a network signal such as a mobile telephone signal or wireless network signal that can be momentarily interacted with by a user device. Such momentary interactions may be sufficient to ensure that the delivery entity is following the correct delivery route without affecting the efficiency of the delivery entity in attempting to deliver the item. In accordance with at least one embodiment, to incentivize the delivery entity to adhere to a generated delivery route, the one or more service provider computers may reward an association of one or more virtual assets based on the adherence by the delivery entity to the delivery route. For example, for each spot or location interacted with by the delivery entity's user device, a virtual asset may be associated with a corresponding user profile with an additional amount or type of virtual assets rewarded based on the accuracy of the adherence or completion of delivery within a certain time period.

FIG. 11 illustrates an example architecture for implementing an augmented reality service feature, in accordance with at least one embodiment. In architecture 1100, one or more users 1102 (e.g., customers, users, delivery entities, etc.,) may utilize user computing devices 1104(1)-(N) (collectively, user devices 1104) to access a browser application 1106 or a user interface (UI) accessible through the browser application 1106, via one or more networks 1108 to provide information such as an interaction with an item, geo-location information for the user device 1104, or information identifying an order for an item, a trade for an item, or an offer to sell an item as described herein. The "browser application" 1106 can be any browser control or native application that can access and display a network page or other information such as a native software application for enabling the presentation of an augmented reality and interaction, via the user device 1104, with objects, virtual assets, or items presented in the augmented reality. A native software application may include an application or program that has been developed for use on a particular platform (such as an operating system) or a particular device (such as a particular type of mobile device or user device 1104). In embodiments, the user device 1104 may include one or more components for enabling interaction by the user device 1104 with a machine-readable identifier associated with an item such as components enabling barcode, quick response (QR) code, RFID, NFC, wireless network, or other types of interactions between the user device 1104 and the machine-readable identifier.

The user devices 1104 may include at least one memory 1110 and one or more processing units or processor(s) 1112. The memory 1110 may store program instructions that are loadable and executable on the processor(s) 1112, as well as data generated during the execution of these programs. Depending on the configuration and type of the user devices 1104, the memory 1110 may be volatile (such as random access memory (RAM)) and/or non-volatile (such as read-only memory (ROM), flash memory, etc.). The user devices 1104 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1104. In some implementations, the memory 1110 may include multiple different types of memory, such as static random access memory (SRAM), dynamic random access memory (DRAM), or ROM.

Turning to the contents of the memory 1110 in more detail, the memory 1110 may include an operating system and one or more application programs or services for implementing the features disclosed herein. Additionally, the memory 1110 may include one or more modules for implementing the features described herein.

The architecture 1100 may also include one or more service provider computers 1114 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 1114 may implement or be an example of the service provider computer(s) 110 of FIG. 1. The one or more service provider computers 1114 may also be operable to provide site hosting, computer application development, and/or implementation platforms, combinations of the foregoing, or the like to the one or more users 1102.

In some examples, the networks 1108 may include any one or a combination of many different types of networks, such as cable networks, the Internet, wireless networks, cellular networks and other private and/or public networks. While the illustrated example represents the users 1102 communicating with the service provider computers 1114 over the networks 1108, the described techniques may equally apply in instances where the users 1102 interact with the one or more service provider computers 1114 via the one or more user devices 1104 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1114 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1114 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1114 may be in communication with the user device 1104 via the networks 1108, or via other network connections. The one or more service provider computers 1114 may include one or more servers, perhaps arranged in a cluster or as individual servers not associated with one another.

In one illustrative configuration, the one or more service provider computers 1114 may include at least one memory 1116 and one or more processing units or processors(s) 1118. The processor(s) 1118 may be implemented as appropriate in hardware, computer-executable instructions, firmware, or combinations thereof. Computer-executable instruction or firmware implementations of the processor(s) 1118 may include computer-executable or machine-executable instructions written in any suitable programming language to perform the various functions described when executed by a hardware computing device, such as a processor. The memory 1116 may store program instructions that are loadable and executable on the processor(s) 1118, as well as data generated during the execution of these programs. Depending on the configuration and type of the one or more service provider computers 1114, the memory 1116 may be volatile (such as RAM) and/or non-volatile (such as ROM, flash memory, etc.). The one or more service provider computers 1114 or servers may also include additional storage 1120, which may include removable storage and/or non-removable storage. The additional storage 1120 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1116 may include multiple different types of memory, such as SRAM, DRAM, or ROM.

The memory 1116, the additional storage 1120, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1116 and the additional storage 1120 are all examples of non-transitory computer storage media. Additional types of non-transitory computer storage media that may be present in the one or more service provider computers 1114 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 1114. Combinations of any of the above should also be included within the scope of non-transitory computer-readable media.

The one or more service provider computers 1114 may also contain communication connection interface(s) 1122 that allow the one or more service provider computers 1114 to communicate with a data store, another computing device or server, user terminals and/or other devices on the networks 1108. The one or more service provider computers 1114 may also include I/O device(s) 1124, such as a keyboard, a mouse, a pen, a voice input device, a touch input device, a display, speakers, a printer, etc.

Turning to the contents of the memory 1116 in more detail, the memory 1116 may include an operating system 1126, one or more data stores 228, and/or one or more application programs or services for implementing the features disclosed herein including the augmented reality service module 1130. In accordance with at least one embodiment, the augmented reality service module 1130 may be configured to at least maintain and update associations of virtual assets between items, user profiles, venues, vendors, or portions of a web page, cluster or segment user profiles into one or more groups, utilize the groups and/or the virtual assets associated with a user profile to generate recommendations for other items, venues, or vendors, and verify and track delivery of an item and adherence to a generated route by a delivery entity.

Figure 12:
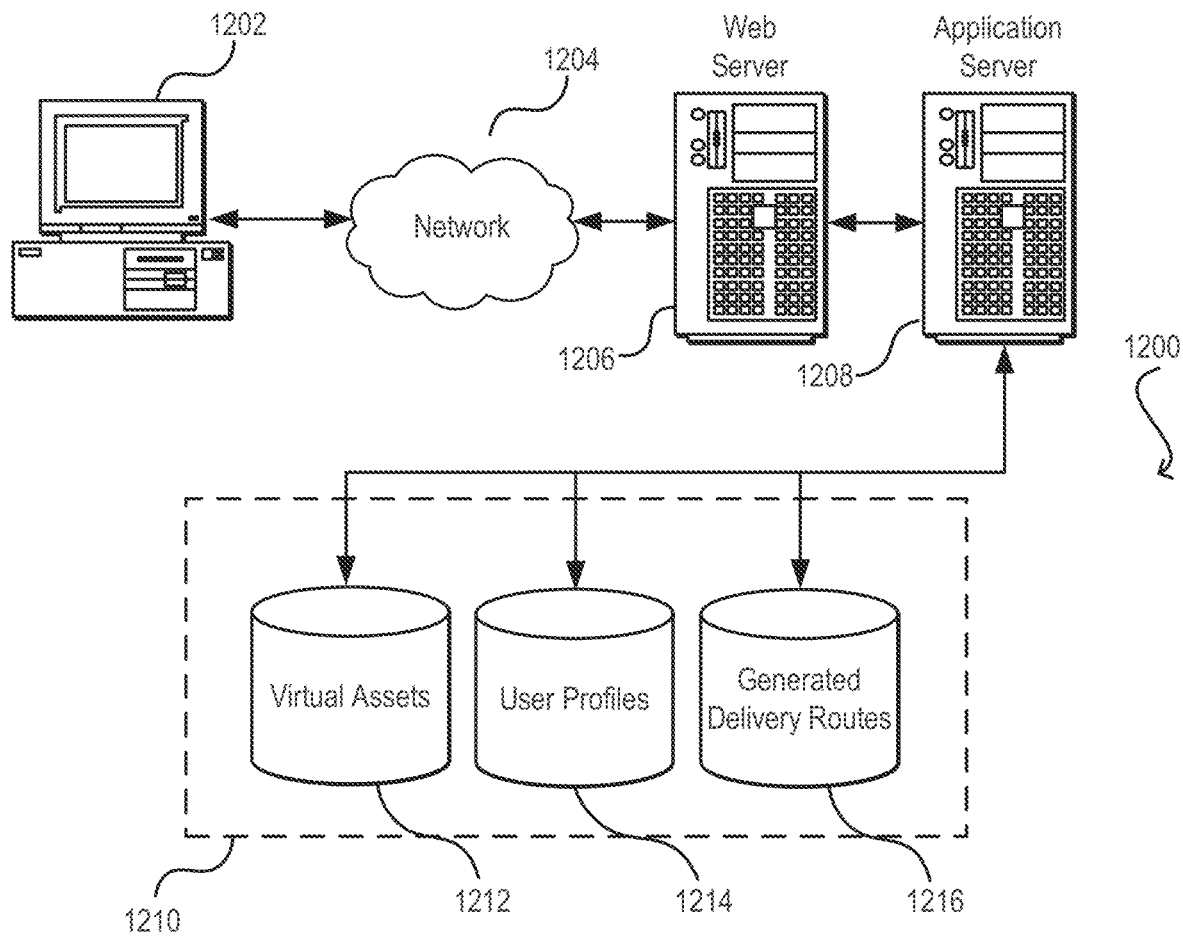
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect or embodiment described herein. For example, the data store illustrated includes mechanisms for storing virtual assets 1212 (i.e., associations of virtual assets to vendors, venues, web pages, web sites, portions of web sites, or user profiles) and generated delivery routes 1216, which can be used to serve content for the production side, generate recommendations for items, venues, or vendors and track and verify deliveries of items to users. The data store also is shown to include a mechanism for storing user profiles 1214, which can be used for reporting, analysis, or other such purposes such as generating recommendations for other virtual assets, items, or segmenting/clustering user profiles of users into one or more groups to generate more relevant recommendations. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computer system, first information that identifies associations of a plurality of virtual assets to a plurality of items offered by an electronic marketplace, a virtual asset of the plurality of virtual assets being a tradable and collectible digital entity;
   receiving, by the computer system, an order for an item of the plurality of items offered by an electronic marketplace;
   associating, by the computer system, a machine-readable identifier with the item, the machine-readable identifier representing an association of a particular virtual asset of the plurality of virtual assets with the item;
   instructing, by the computer system, delivery of the item to a location associated with the order;
   receiving, by the computer system and from a user device, an indication of an interaction by the user device with the machine-readable identifier of the item, the indication including first geo-location information for the user device;
   verifying, by the computer system, delivery of the item to the location based at least in part on first geo-location information provided by the user device and second geo-location information associated with the location;
   associating, by the computer system, the particular virtual asset, from the machine-readable identifier, to a user profile associated with the user device based at least in part on verifying delivery of the item to the location and the indication, the associating of the particular virtual asset to the user profile including mapping the particular virtual asset to the user profile by the computer system;
   identifying, by the computer system, one or more clusters of user profiles based at least in part on one or more of a threshold associated with a group of one or more groups of the user profiles, a type of virtual assets associated with the user profile, and items of the plurality of items associated with the virtual assets associated with the user profile and the one or more groups of the user profiles;
   generating, by the computer system, a recommendation for one or more virtual assets of the plurality of virtual assets based at least in part on the user profile and the one or more clusters of user profiles, the recommendation for the one or more virtual assets identifying the type of the virtual assets and a number of the virtual assets corresponding to the one or more virtual assets; and
   transmitting, by the computer system and to the user device, the recommendation.

2. The computer-implemented method of claim 1, wherein the interaction by the user device with the machine-readable identifier includes an augmented reality interaction.

3. The computer-implemented method of claim 1, further comprising transmitting, by the computer system and to the user device, a notification that the particular virtual asset has been associated with the user device.

4. The computer-implemented method of claim 1, wherein the recommendation is transmitted, by the computer system and to the user device, via a communication channel identified in the user profile.

5. The computer-implemented method of claim 1, wherein the recommendation further includes an item category associated with the one or more virtual assets.

6. A computer system comprising:
   memory that stores computer-executable instructions; and
   at least one processor configured to access the memory and execute the computer-executable instructions to collectively at least:
     maintain first information that identifies associations of a plurality of virtual assets to a plurality of items offered by an electronic marketplace, a virtual asset of the plurality of virtual assets being a tradable and collectible digital entity;
     receive an order for an item of the plurality of items offered by an electronic marketplace;
     associate a machine-readable identifier with the item, the machine-readable identifier representing an association of a particular virtual asset of the plurality of virtual assets with the item;
     instruct delivery of the item to a location associated with the order;
     receive, from a user device, an indication of an interaction by the user device with the machine-readable identifier of the item, the indication including first geo-location information for the user device;

verify delivery of the item to the location based at least in part on first geo-location information provided by the user device and second geo-location information associated with the location;

associate the particular virtual asset, from the machine-readable identifier, to a user profile associated with the user device based at least in part on verifying delivery of the item to the location and the indication, the associating of the particular virtual asset to the user profile including mapping the particular virtual asset to the user profile by the computer system;

identify one or more clusters of user profiles based at least in part on one or more of a threshold associated with a group of one or more groups of the user profiles, a type of virtual assets associated with the user profile, and items of the plurality of items associated with the virtual assets associated with the user profile and the one or more groups of the user profiles;

generate a recommendation for one or more virtual assets of the plurality of virtual assets based at least in part on the user profile and the one or more clusters of user profiles, the recommendation for the one or more virtual assets identifying the type of the virtual assets and a number of the virtual assets corresponding to the one or more virtual assets; and transmit, to the user device, the recommendation.

7. The computer system of claim 6, wherein the interaction by the user device with the machine-readable identifier includes an augmented reality interaction.

8. The computer system of claim 6, wherein the computer-executable instructions when executed by the at least one processor further cause the computer system to transmit, to the user device, a notification that the particular virtual asset has been associated with the user device.

9. The computer system of claim 6, wherein the recommendation is transmitted to the user device via a communication channel identified in the user profile.

10. The computer system of claim 6, wherein the recommendation further includes an item category associated with the one or more virtual assets.

11. A non-transitory computer-readable storage medium storing computer-executable instructions that, when executed with a computer system, cause the computer system to perform operations comprising:

maintaining first information that identifies associations of a plurality of virtual assets to a plurality of items offered by an electronic marketplace, a virtual asset of the plurality of virtual assets being a tradable and collectible digital entity;

receiving an order for an item of the plurality of items offered by an electronic marketplace;

associating a machine-readable identifier with the item, the machine-readable identifier representing an association of a particular virtual asset of the plurality of virtual assets with the item;

instructing delivery of the item to a location associated with the order;

receiving, from a user device, an indication of an interaction by the user device with the machine-readable identifier of the item, the indication including first geo-location information for the user device;

verifying delivery of the item to the location based at least in part on first geo-location information provided by the user device and second geo-location information associated with the location;

associating the particular virtual asset, from the machine-readable identifier, to a user profile associated with the user device based at least in part on verifying delivery of the item to the location and the indication, the associating of the particular virtual asset to the user profile including mapping the particular virtual asset to the user profile by the computer system;

identifying one or more clusters of user profiles based at least in part on one or more of a threshold associated with a group of one or more groups of the user profiles, a type of virtual assets associated with the user profile, and items of the plurality of items associated with the virtual assets associated with the user profile and the one or more groups of the user profiles;

generating a recommendation for one or more virtual assets of the plurality of virtual assets based at least in part on the user profile and the one or more clusters of user profiles, the recommendation for the one or more virtual assets identifying the type of the virtual assets and a number of the virtual assets corresponding to the one or more virtual assets; and transmitting, to the user device, the recommendation.

12. The non-transitory computer-readable storage medium of claim 11, wherein the interaction by the user device with the machine-readable identifier includes an augmented reality interaction.

13. The non-transitory computer-readable storage medium of claim 11, further comprising instructions that are executable by the computer system to transmitting, to the user device, a notification that the particular virtual asset has been associated with the user device.

14. The non-transitory computer-readable storage medium of claim 11, wherein the recommendation is transmitted, to the user device, via a communication channel identified in the user profile.

15. The non-transitory computer-readable storage medium of claim 11, wherein the recommendation further includes an item category associated with the one or more virtual assets.

* * * * *